Nov. 9, 1971 — K. V. BECKER — 3,618,151
METHODS OF STIFFENING A SHOE COMPONENT
Filed Sept. 15, 1970 — 2 Sheets-Sheet 1

Inventor
Karl V. Becker
By his Attorney
Benjamin C. Pollard

United States Patent Office
3,618,151
Patented Nov. 9, 1971

3,618,151
METHODS OF STIFFENING A SHOE COMPONENT
Karl V. Becker, Boxford, Mass., assignor to
USM Corporation, Boston, Mass.
Continuation-in-part of application Ser. No. 867,642,
Oct. 30, 1969. This application Sept. 15, 1970,
Ser. No. 72,410
Int. Cl. A43d
U.S. Cl. 12—146 D      10 Claims

ABSTRACT OF THE DISCLOSURE

The method of stiffening a selected area of a shoe component in which an open fabric of interwoven threads is assembled with the area to be stiffened, molten synthetic polymeric material is flowed around the threads, through openings between the threads and into wetting engagement with the area to be stiffened of the shoe component and the polymeric material is cooled to form a cellular layer of hardened polymeric material in which the cells are the spaces kept free from polymeric material by the threads. A liner may be pressed into adhesive engagement with the polymeric material in heated tacky condition at the free surface of the open fabric.

---

This application is a continuation-in-part of my copending application Ser. No. 867,642, filed Oct. 30, 1969 entitled "Stiffened Sheet Material and Method for Stiffening."

FIELD OF THE INVENTION

The present invention relates to a method for stiffening selected areas of shoe components.

BACKGROUND OF THE INVENTION

In the stiffening of selected areas of shoe uppers, particularly the toe and heel ends for the purpose of preserving a desired shape, a well accepted method is that forming the subject matter of the U.S. patent to Chaplick and Rossitto No. 3,316,573 dated May 2, 1967 in which molten resin is applied as a thin layer to the portion to be stiffened and is cooled to stiff, resilient condition. When the shoe includes a lining, the lining may be pressed lightly against the resin while the resin is still tacky and adhesive to bond the lining in place in the shoe.

Shoes of which portions have been stiffened by the process of the patent have been found very satisfactory for most purposes. However, particularly for men's shoes, and in shoe counters greater stiffness and strength are sometimes desirable. This need cannot be met by simply using a thicker layer of resin because of difficulties of maintaining interior smoothness because of bubbles entrapped in the resin as well as difficulties in shoemaking and in breakdown in the finished shoe.

SUMMARY OF THE INVENTION

It is an object of the present invention to provide a method for stiffening shoe components in which the advantages of the hot melt stiffening method are retained but in which there is formed a stiffened component having greater stiffness and resistance to breakdown.

To this end and in accordance with a feature of the present invention, a flexible open fabric of interwoven threads is laid down on the area to be stiffened and molten synthetic polymeric material is flowed around the threads, through openings between the threads and into wetting engagement with the area to be stiffened of the shoe component. A further shoe component such as a liner may be pressed into adhesive engagement with polymeric material at the surface of the open fabric while that polymeric material is in soft adhesive condition. The shoe component is then shaped, preferably with the polymeric material in heated condition. On cooling, the polymeric material, open fabric, shoe component and liner, if that is used, are united into a strong, breakdown-resistant stiffened composite which will retain its shape against deforming stresses.

The invention will be described in connection with the drawings, in which.

Figure 1:
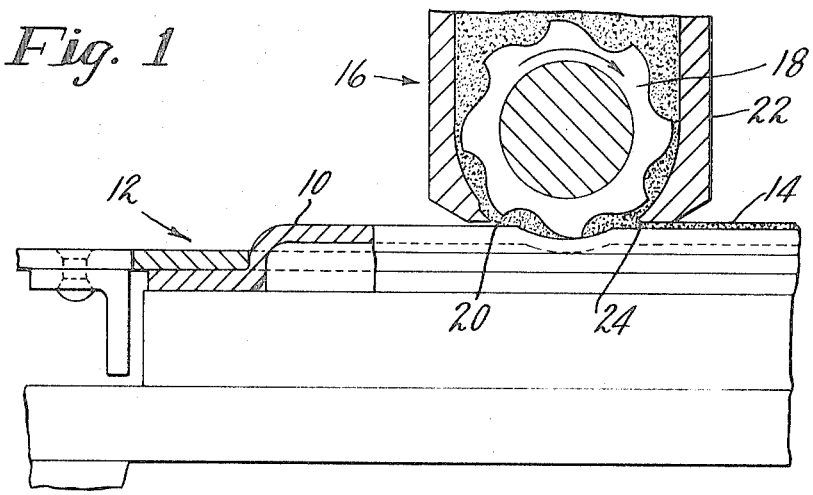
FIG. 1 is an elevational view partially in section showing the application of molten polymeric material to a shoe part and the relation of the polymeric material to the shoe part after coating.

The shoe component 10 to be stiffened, e.g. a shoe part such as the toe or quarter of a shoe upper or counter lining or counter pocket of a shoe upper, is held, ordinarily in general flat condition, for application of molten polymeric material. It has been found convenient to mount the shoe component 10 in a work holder 12 (see FIG. 1) which supports it with the surface to be treated exposed.

In a first embodiment of the invention a layer 14 of normally stiff, resilient, synthetic polymeric material in viscous molten condition is spread on the exposed surface of the shoe component. Spreading may be carried out by hand but is preferably carried out using a mechanical applicator 16 including a rotating applicator wheel 18 disposed in the otherwise open lower end 20 of a heated chamber 22 containing the molten stiffening material. A metering blade 24 which may be the lower edge of the chamber 22 is adjustable by raising or lowering applicator 16 to control the thickness of the applied material. It will be set to provide a layer 14 containing sufficient of the polymeric material to flow around the threads and through the spaces 26 between threads 28 in open weave fabric 30 to be laid down and preferably, as shown more clearly in FIG. 4, sufficient to provide a stratum 31 of polymeric material in addition to the polymeric material in the spaces in the fabric. Reference is made to U.S. Pat. 3,316,573 referred to above for a more complete description of the work holding means, applicator head and application procedure.

Figure 2:
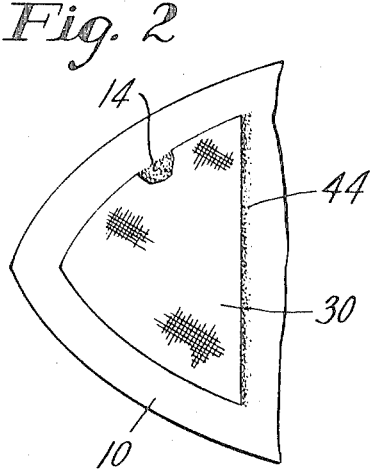
FIG. 2 is a plan view showing an open weave fabric laid down on the molten polymeric material coating and the relation of the shoe part, coating and fabric.

A flexible open weave fabric 30 is laid down on the layer 14 as shown in FIG. 2 while the layer 14 is in soft adhesive condition and flowable under pressure. In the preferred operation, the fabric is laid down directly after the molten synthetic polymeric material layer 14 is applied so that the layer is still in soft and adhesive condition from retained sensible heat in the body of polymeric material laid down. It is, however, within the spirit of the invention to bring polymeric material which has cooled and hardened, back to soft adhesive condition by application of further heat to its surface before the fabric 30 is laid down.

Figure 3:
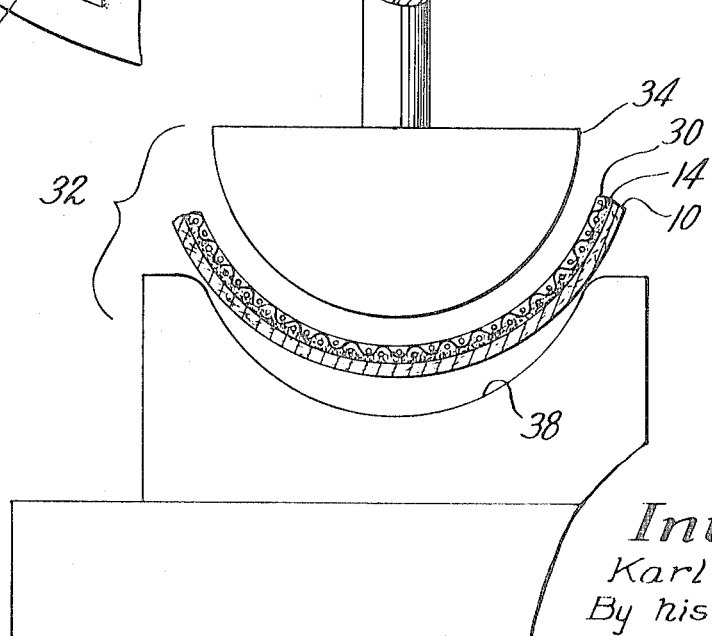
FIG. 3 is an elevational view partially in section showing a pressing step and press which may be used in the method of the invention.
Figure 5:
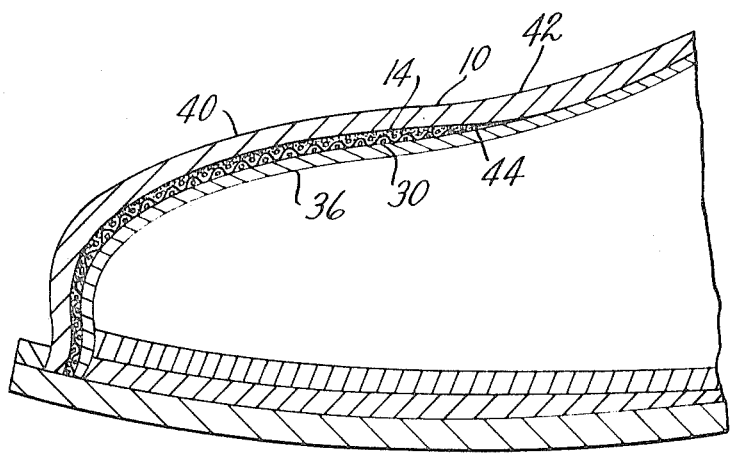
FIG. 5 is a side section with parts broken away of the toe portion of a formed and lasted shoe upper including the stiffened shoe portion and a liner after conformation and consolidation of shoe parts.

After the fabric 30 is laid down on the layer 14, it is preferably pressed as in a press 32 as shown in FIG. 3 to insure flow of the hot material up through open spaces between and around threads in the fabric 30 and good overall interaction of the fabric 30 and the material of the layer. The pressing surface 34 which will engage the fabric 30 may be heated to prevent chilling of the polymeric material and insure desired softness; but it is emphasized that the heat, pressure and time of pressing are kept less than enough to impregnate the interior of the threads 28 with polymeric material. The polymeric material which has flowed up through the open spaces 26 to the surface of the fabric is available to bond a lining 36 in place (see FIG. 5) and form a unitized shoe construction. When a lining 36 is used, it will preferably be disposed adjacent the fabric 30 before the pressing step in order that molten polymeric material may be pressed through the fabric 30, around the threads 28 and into adhesive engagement with the lining 26.

As shown in FIG. 3, the pressing surfaces 34 and 38 of the press 32 used in a preferred form of the process have a curve roughly comparable to the curve of the shoe component in the finished shoe. For example, in the toe portion the pressing surfaces 34 and 38 may be complementary, partially cylindrical sections with radii of the order of the radius of an averaged curve of a transverse section of the finished shoe upper 40 at the tip line 42. This pressing apparently effects a shift of portions of the fabric 30 relative to the shoe part 10 while the layer 14 of polymeric material is soft. Hardening of the polymeric material locks the fabric 30 in the new relationship to the shoe part 10. Even though the composite of shoe part 10, polymeric material layer 14 and fabric 30 largely flattens out on removal from the press 32 because of the resilience of the shoe part and fabric, the new relationship of the fabric 30 to the shoe part 10 gives better lasting apparently because the distribution of the fabric reduces bunching and pleating of the fabric in conforming to a last and also gives a stronger stiffened area in the finished shoe than is obtained without this step.

The fabric piece 30 preferably has an outline shape and size such that a major portion of its area coincides with the area covered by the polymeric material layer 14 so that it is adhesively secured to that coating over substantially its entire area. In a preferred form of the invention, area 44 of the polymeric material layer 14 extends beyond the fabric 30 adjacent the tip line 42 (see FIGS. 2 and 5), and provides the advantage that the material in this area may taper in thickness towards the tip line 42 to provide a smooth transition in stiffness. Additionally, the area 44 is a zone free from fabric in which there may be better engagement of the lining 36 with the polymeric material to provide a stronger union at an area of greater stress. It may be desirable also to have marginal portions of the fabric piece free from engagement with the coating as by extending beyond the area of the layer 14, for example, adjacent the lasting margins to aid in locating the fabric piece, and/or for removal of edge portions of the fabric to a fixed line or for other purpose.

In order to insure the interaction of the open fabric 30 with the molten material on the shoe component it is important that the fabric 30 be of a material such as cotton, linen, jute, hemp or other natural or synthetic fiber which does not melt from the heat of the applied molten material, and which is woven to have substantial openness. The dimensions of the cross section of the openings 26 between the threads 28 of the fabric 30 which will give most effective action depend on the thickness of the fabric 30, i.e. the openings should be larger with thicker fabrics, and in general, should be at least about one half and not more than about 15 times the cross section of the threads 28 of which the fabric 30 is woven. Preferably, the cross section of the openings is from about 2 to about 10 times the cross sectional area of the threads. It is also important that the threads 28 themselves comprise closely associated fibers or filaments 46 making up a compressible element in which the fibers or filaments are capable of at least limited relative movement with respect to each other. Fabrics which have been found useful include such materials as Osnaburg having a thread count of from 16 by 40, a woven burlap having a thread count of from 12 by 20, and other open weave fabrics.

A wide variety of heat softenable synthetic polymeric resinous materials may be used in the present process. These materials may be either permanently thermoplastic or may be heat softenable and converted by heat or other means to a higher melting or infusible condition. Among useful materials are the polyesters and copolyesters, polyamides and copolyamides, polyesteramides, polyvinyl compounds, such as polystyrenes, polyvinyl acetate and so on. Pat. 3,316,573 above referred to provides a fuller description of polymeric materials including preferred ranges of softening points and application temperatures useful for forming the stiffener layer in the present method and the disclosure of that patent is incorporated by reference.

Viscosity of the molten material depends on the nature of the polymeric material and on the temperature. In the formation of a layer of polymeric material on a shoe component, it is important that the molten material used and the temperature at which it is applied give a viscosity low enough to wet and adhere to the surface on which it is applied but sufficiently high that it will not penetrate through the shoe component to be stiffened. The layer will ordinarily be from about 0.010 inch to about 0.045 inch in thickness.

It is also important that the temperature of the polymeric material at the time when the fabric 30 is laid down give a viscosity to the polymeric material low enough to wet and adhere to the fabric, to enter the macroscopic openings between the threads of the fabric and to flow around the threads; but the temperature must be sufficiently low that the viscosity of the polymeric material will be sufficiently high that it will not penetrate substantially between filaments or fibers making up the threads into central portions of the thickness of the threads. The desired wetting and spreading properties are secured by using an application temperature for a given polymeric material such that its falling ball viscosity at the application temperature is not less than about 30 seconds as determined with a 3/16" steel ball falling through the middle four inches of a column of molten material in a 25 mm. diameter tube, 150 mm. in length.

Figure 4:
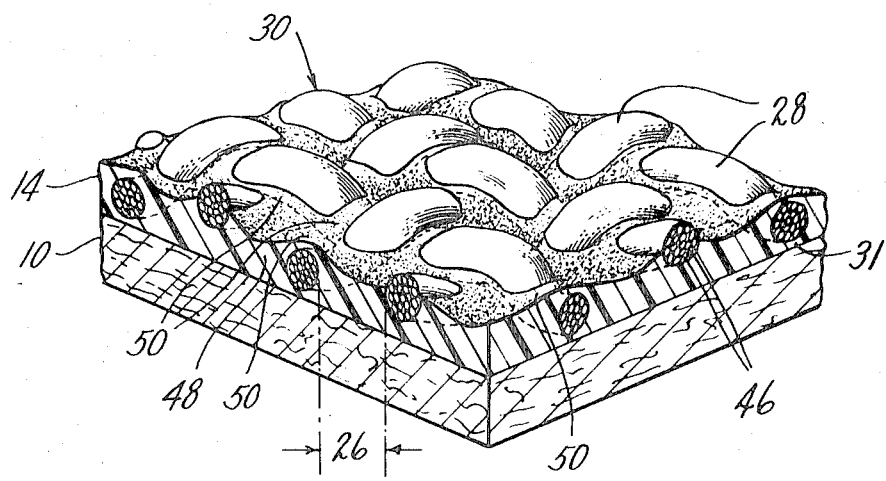
FIG. 4 is an angular view on an enlarged scale showing the structure of the polymeric material in relation to the fabric and shoe part.

As shown in FIG. 4, the polymeric material which has flowed into the openings 26 between threads hardens as solid plugs 48 extending from one face of the fabric to the other, and the material which flowed into the valleys between overlying and underlying crossing threads hardens as braces or bridging members 50 holding the plugs 48 in spaced relation and providing stiffness when the fabric 30 is flexed. It will be observed that if the threads 28 were taken out of the hardened layer 14 the polymer material would be in the form of a cellular body with regular openings or cells where the threads had been. Since the threads 28 are compressible, the resin layer 14 with the threads in place functions in a manner similar to a cellular body having a good stiffness value but an ability to compress or elongate without fracture of the resin body when the layer is flexed.

An important feature of the new method is that the cellular layer developed provides a substantially greater spacing between shoe upper material and the normally rather firm fabric of the lining than is obtainable with the usual resin layer. This insures displacing structurally strong members farther from the neutral axis and giving greater stiffness. As noted the layer is constituted of solid plugs or columns filling the spaces between threads and these are effective to maintain the spacing even against substantial stresses. Also these plugs are laterally braced by the resin which has flowed around the threads at crossing points so that they cooperate to resist relative movement of the shoe upper material and lining. Thus in addition to the stiffness of the resin layer itself there is obtained a novel structural sandwich in which a given quantity of resin gives a stiffness heretofore requiring a substantially greater quantity of resin.

Although the invention has been described in that form wherein a layer of molten polymeric material is deposited directly on the shoe component and the open weave fabric laid down on the molten layer, the order may be reversed. That is, the open weave fabric may be assembled against the area to be stiffened and molten material applied to the exposed face of the fabric and flowed down through the openings between the threads, around the threads and into wetting adhesive engagement with the surface of the shoe component. In this form of the invention the polymeric material will have a cellular structure similar to that produced by laying down the open weave fabric on a molten layer of polymeric material, as in the first described embodiment and will have cells formed by the threads. As in the first described form of the invention, the polymeric material is available to bond a lining to form a unitized shoe structure. Also in a preferred form, the layer of molten polymeric material may extend beyond the margins of the fabric both to allow tapering thickness at a margin and also to provide a stronger bond to the lining.

For completion of a shoe the stiffened portion will ordinarily be heated to a moldable but not freely flowable condition at an elevated temperature below the melting point of the polymeric material. This may be done by steaming, radiant heat or other heating procedures. After heating, a further shoe element such as a liner 36 is ordinarily brought over the exposed surface of the fabric 30 and into contact with polymeric material exposed at the surface of the fabric 30 and the shoe upper is subjected to pressure to conform it to the desired shape. For example, the shoe upper may be placed on a last or other shaper with the polymeric stiffener material in moldable condition and tension applied to the shoe upper to press it into firm engagement with the last to shape the stiffener. With the polymeric material in heat softened condition, the pressure acts to join the shoe upper and further shoe element and fabric in the desired relation. On cooling, the joined layers of the shoe upper cooperate to give strength and resilient stiffness to retain the shape into which the shoe upper has been put.

The following examples are given as of assistance in understanding the invention; but it is to be understood that the invention is not limited to the particular materials, procedures or conditions set forth in the examples.

EXAMPLE I

A polyamide resin from condensation of dimerized soybean oil fatty acid with ethylene diamine and having a Ball and Ring softening point of 100° C. to 116° C. and a melt viscosity at 330° F. in the range of 30 to 60 seconds, as determined with a 3/16" steel ball falling through the middle four inches of a column of molten material in a 25 mm. diameter tube 150 mm. in length was supplied to an applicator of the type described above.

A leather shoe upper was secured with its toe portion in a work holder such as described above with the portion to be stiffened exposed for engagement with the applicator wheel of the applicator. With the temperature of the applicator adjusted to about 350° F., a coating .020 inch thick was spread on the area to be stiffened. Thereafter, while the resin was still molten, a lightweight burlap with a thread count of 20 by 20 and with its edges cut to an outline similar to the area covered with molten resin was pressed onto the molten resin to cause it to adhere. The liner was then laid down on the burlap, the assembly put in a press and pressure applied to cause the molten resin to flow around the threads through the openings between the threads and into wetting adhesive engagement with the liner. The platen in contact with the liner was at a temperature of about 350° F., the pressure was about 70 pounds per square inch and pressure was maintained for about four seconds.

The unlasted shoe upper containing the reinforced portion was subjected to radiant heat for about 60 seconds to bring its temperature to from about 175° F. to about 185° F. Thereafter, the shoe was lasted and further operations such as soling, heeling and the like were carried out and the shoe removed from the last. The heat and pressure softened the resin and combined the parts in the desired relative position.

The toe portion of the shoe was found to have good resilient stiffness together with superior resistance to cracking.

EXAMPLE II

The following tests were carried out to show the effect of the thickness of the resin layer in relation to the character and thickness of the open fabric with and without a liner. The test procedure was that developed for determining relative strengths of shoe stiffeners. Test specimens of a stiffened shoe upper material 3½" long by one inch in width were mounted in a holder having spaced parallel slots in a base, the slots being inclined toward each other at an angle of 45° to the base and the bottoms of the slots being spaced 3" apart. The perpendicular distance of the bottom of the slots to the upper face of the holder was ⅜". The specimens were disposed in the holder with their ends at the bottom of the spaced slot and were clamped firmly in the slots. Since the spacing of the bottoms of the slots was less than the length of the test specimens, the specimens in the holder were in a curve comparable to the curve in a toe portion of a shoe. The holder with the specimen clamped in place was placed on the base plate of an Instron test machine with a pressure member arranged to apply force against the center portion of the bowed specimen. The pressure member was a ⅞" diameter rod of which the specimen engaging surface was a spherical section of ¾" radius. The pressure member was moved down to apply force against the specimen at a rate of 1" per minute and the stiffness value was the pressure in pounds required to depress the central portion of the specimen 0.2". The testing of each specimen involved taking two readings with movement of the pressure member up and down at the same rate. The figures reported in the table are averages of such readings.

Specimens to be tested according to this example were prepared by applying a layer of molten resin to the shoe upper material on the foot side of the material using the applicator, the resin and the application conditions described in Example I. In those portion of the tests where fabric alone or with liner materials were used, they were laid down on the hot molten resin directly after application of the resin and the assembly was pressed between curved platens of a press of which the platen adjacent the fabric and liner was heated to a temperature of 375° F. A pressure of 80 p.s.i. was applied for five seconds. After removal from the press the specimens were cooled before insertion in the specimen holder and testing.

In the series of tests recorded in the following table, the shoe upper material was fabric-backed vinyl shoe upper material. The fabrics were the following open weave cotton materials:

(1) Clinton Mill cotton fabric weighing 76 grams per square yard having a thread count of 64 x 60 and a thickness of 0.011".

(2) Osnaburg weighing 121 grams per square yard, having a thread count of 34 x 26 and a thickness of 0.02".

(3) Herringbone twill weighing 193 grams per square yard, having a thread count of 68 x 40 and a thickness of 0.023".

(4) Pepperill bootleg duck weighing 217 grams per square yard, having a thread count of 28 x 18 and a thickness of 0.031".

The liner was a conventional tight weave cotton fabric having a thickness of 0.024".

|  | Reinforcing fabric | 15 mil stiffness | 20 mil stiffness | 25 mil stiffness | 30 mil stiffness | 35 mil stiffness |
| --- | --- | --- | --- | --- | --- | --- |
| Resin and vinyl shoe upper |  |  .3 | .44 | .92 | 1.2 | 1.2 |
| Resin and vinyl shoe upper and reinforcing fabric | 1 | .93 | 1.2 | 1.5 | 1.8 | 1.9 |
|  | 2 | 1.0 | 1.0 | 1.5 | 2.3 | 2.8 |
|  | 3 | 1.2 | 2.0 | 2.1 | 2.8 | 3.4 |
|  | 4 | 1.6 | 2.3 | 3.5 | 3.8 | 4.1 |
| Resin and vinyl shoe upper and reinforcing fabric and liner | 1 |  |  | 3.7 | 4.1 | 4.1 |
|  | 2 |  |  | 3.8 | 4.3 | 5.0 |
|  | 3 |  |  | 3.1 | 4.1 | 7.1 |
|  | 4 |  |  | 4.8 | 6.4 | 8.0 |

The test results show a great increase in stiffening action in a resin layer into which fabric had been pressed over the thickness added by the same thickness of resin alone. Thus, where 15 mils of resin were applied to the shoe upper material the stiffness with the resin alone was .3 lb., while the stiffnesses where fabric was pressed into that layer were from 3 to 5 times as great, i.e. from 0.93 to 1.6 lbs. Microscopic examination of a cross section of the composite of shoe upper material resin and fabric showed that the resin had not impregnated the fabric, i.e. had not penetrated to the interior of the threads of the fabric, and the fibers making up the threads retained their ability to move relative to each other within the threads. The apparent result of pressing the fabric into the molten resin layer was to create a cellular structure in the resin layer in which the threads of the fabric occupied the cells. This positioned the resin most effectively to provide maximum stiffness with a minimum amount of resin. Also the threads within the cells were resiliently compressible and gave a desirable flex character as well as resisting collapse of the cell walls. This evaluation is strengthened by the fact that the thicker fabrics although having not substantially greater stiffness of themselves generated a larger celled structure in which the resin of the layer was displaced farther from the neutral axis and hence in position to give greater stiffening action. This was more noticeable with the resin layers thicker than 20 mils where the quantity of resin was sufficient to give a fuller cellular structure. Thus, the Osnaburg, herringbone twill and duck were thicker than the Clinton Mill fabric and gave significantly greater stiffness with thicker resin layers.

Resin layers less than 25 mils in thickness provided insufficient resin to cause enough resin to penetrate the openings in the fabrics for effective bonding of the liner. With resin layer thicknesses of 25 mils and above it appears that the irregularity of the surface of the liner allowed more effective distribution of resin which had passed through the open weave fabric than was obtained where the open weave fabric was disposed against the smooth impermeable surface of the press platen. That is, since the individual threads of the open weave fabric are compressible in thickness as well as being flexible, the fabric may be flattened when pressed directly against the surface of the press platen to restrict or close off passages for flow of molten resin around the threads adjacent the platen surface. On the other hand, the irregularity of the liner surface allowed flow of molten resin around the threads and permitted the development of a significant concentration of resin between the open weave fabric and the liner. In the reinforcing structure so formed greater proportions of resin were disposed adjacent the surface of the shoe upper material and between the open weave fabric and the liner than where the liner was not used. Since this resin was effectively displaced from the neutral axis while the cellular structure around the threads of the open weave fabric maintained the spacing of these layers, the structure was in effect a structural sandwich with a honeycomb core.

Having thus described my invention, what I claim as new and desire to secure by Letters Patent of the United States is:

1. The method for stiffening a selected area of a shoe component comprising the steps of laying down on said area an open fabric of interwoven threads comprising closely associated fibers, flowing hot molten synthetic polymeric material around said threads and through openings between the threads of said fabric and into wetting engagement with said area of said shoe component, said molten material having a viscosity sufficiently high that the polymeric material does not penetrate through said shoe component and does not penetrate central portions of the thickness of said threads, cooling said polymeric material to form a hardened layer defined by the hardened polymeric material in said openings and around said threads and applying conforming pressure to shape said shoe to the desired configuration.

2. The method for stiffening a shoe component as defined in claim 1 in which said synthetic polymeric material is applied as a layer in hot molten condition to the surface of said area of said shoe component and thereafter said fabric is pressed into said layer while said polymeric material remains molten from the initial sensible heat of the hot molten polymeric material to cause portions of said coating to flow around said threads and through openings between said threads.

3. The method for stiffening a shoe component as defined in claim 2 in which said fabric is pressed into said layer on said shoe component between curved pressing surfaces having a curvature comparable to the curvature of the shoe component in a finished shoe, the pressing surface adjacent the fabric being heated to retard chilling and loss of fluidity of said polymeric material.

4. The method for stiffening a shoe component as defined in claim 3 in which a further shoe component is pressed into wetting adhesive engagement with portions of said polymeric material layer which have passed through said openings to the surface of said fabric while said exposed portions are in hot tacky condition.

5. The method for stiffening a shoe component as defined in claim 4 in which said lining material is assembled against said fabric before said fabric is pressed into said layer.

6. The method for stiffening a shoe component as defined in claim 5 in which said layer of polymeric material extends beyond said fabric on at least one edge, portions of said layer extending beyond said fabric taper in thickness from a maximum at portions adjacent the edge of said fabric to a minimum at the edge of said layer and said lining is pressed into wetting adhesive engagement with said extending portions while said extending portions are in hot tacky condition.

7. The method for stiffening a shoe component as defined in claim 2 in which said layer of polymeric material has a thickness sufficient to provide a stratum of polymeric material free from fabric between said shoe component and said fabric after said fabric has been pressed into said layer.

8. The method for stiffening a shoe component as defined in claim 1 in which said fabric is assembled against said area of said shoe component and thereafter hot molten synthetic polymeric material is applied to the exposed surface of said fabric and caused to flow around said threads and through the openings between said threads and into wetting engagement with the surface of said area of said shoe component.

9. The method for stiffening a shoe component as defined in claim 8 in which a further shoe component is pressed into wetting adhesive engagement with portions of said polymeric material exposed at the surface of said fabric while said exposed portions are in hot tacky condition.

10. The method for stiffening a shoe component as defined in claim 9 in which said polymeric material extends beyond said fabric on at least one edge, the thickness of the polymeric material beyond said fabric tapers from a maximum at portions adjacent the fabric to a minimum at the edge of the deposited molten material and said further shoe component is pressed into wetting adhesive engagement with said extending portions while said extending portions are in hot tacky condition to form a superior union between said further shoe component and said layer.

References Cited

UNITED STATES PATENTS

| | | | |
|---|---|---|---|
| 1,251,914 | 1/1918 | Ordway | 36—68 |
| 2,009,291 | 7/1935 | Ferguson et al. | 36—77 |
| 2,568,884 | 9/1951 | Ciaio | 12—146 D X |
| 3,234,668 | 2/1968 | Radcliffe | 36—68 |
| 3,316,573 | 5/1967 | Chaplick et al. | 12—146 D |

PATRICK D. LAWSON, Primary Examiner